United States Patent
Gao et al.

(10) Patent No.: US 11,111,152 B2
(45) Date of Patent: *Sep. 7, 2021

(54) PREPARATION METHOD FOR MODIFIED MOLECULAR SIEVE AND MODIFIED MOLECULAR SIEVE-CONTAINING CATALYTIC CRACKING CATALYST

(71) Applicant: PetroChina Company Limited, Beijing (CN)

(72) Inventors: Xionghou Gao, Beijing (CN); Shuhong Sun, Beijing (CN); Yunfeng Zheng, Beijing (CN); Xiaoliang Huang, Beijing (CN); Aiguo Lin, Beijing (CN); Xiaoyan Li, Beijing (CN); Lin Wang, Beijing (CN); Gengzhen Cao, Beijing (CN); Conghua Liu, Beijing (CN); Zhishuang Pan, Beijing (CN); Wei Ding, Beijing (CN); Yahong Wang, Beijing (CN); Dong Wang, Beijing (CN); Qiuxia Teng, Beijing (CN); Haitao Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 752 days.

This patent is subject to a terminal disclaimer.

(21) Appl. No.: 15/750,403

(22) PCT Filed: Aug. 4, 2016

(86) PCT No.: PCT/CN2016/093184
§ 371 (c)(1),
(2) Date: Feb. 5, 2018

(87) PCT Pub. No.: WO2017/020847
PCT Pub. Date: Feb. 9, 2017

(65) Prior Publication Data
US 2018/0222756 A1  Aug. 9, 2018

(30) Foreign Application Priority Data

Aug. 5, 2015  (CN) .......................... 201510475250.5
Aug. 5, 2015  (CN) .......................... 201510475251.X

(51) Int. Cl.
| | |
|---|---|
| G06T 7/77 | (2017.01) |
| G06T 7/73 | (2017.01) |
| C01B 39/24 | (2006.01) |
| C10G 11/05 | (2006.01) |
| B01J 29/08 | (2006.01) |
| B01J 29/40 | (2006.01) |
| B01J 29/14 | (2006.01) |

(Continued)

(52) U.S. Cl.
CPC ............. *C01B 39/24* (2013.01); *B01J 29/084* (2013.01); *B01J 29/088* (2013.01); *B01J 29/146* (2013.01); *B01J 29/405* (2013.01); *B01J 29/46* (2013.01); *B01J 37/0236* (2013.01); *B01J 37/031* (2013.01); *B01J 37/04* (2013.01); *B01J 37/08* (2013.01); *C01B 39/38* (2013.01);

(Continued)

(58) Field of Classification Search
CPC ........ B01J 29/08; B01J 29/084; B01J 29/146; B01J 29/46; B01J 29/405; B01J 39/24; B01J 37/0236; B01J 37/031; B01J 37/04; B01J 37/08
See application file for complete search history.

(56) References Cited

U.S. PATENT DOCUMENTS

| | | | |
|---|---|---|---|
| 3,957,623 A | 5/1976 | McDaniel et al. | |
| 4,218,307 A | 8/1980 | McDaniel | |

(Continued)

FOREIGN PATENT DOCUMENTS

| | | | |
|---|---|---|---|
| CN | 1069553 C | 8/2001 | |
| CN | 1111086 C | 6/2003 | |

(Continued)

OTHER PUBLICATIONS

International Search Report for International Application No. PCT/CN2016/093184, "Preparation Method For Modified Molecular Sieve And Modified Molecular Sieve-Containing Catalytic Cracking Catalyst", dated Oct. 27, 2016.

(Continued)

*Primary Examiner* — Yong L Chu
(74) *Attorney, Agent, or Firm* — Hamilton, Brook, Smith & Reynolds, P.C.

(57) ABSTRACT

A preparation method for modified molecular sieve and a modified molecular sieve-containing catalytic cracking catalyst. The preparation method comprises: mixing molecular sieve slurry, a compound solution containing ions of group IIIB metals of the periodic table of elements, organic complexing agent and/or dispersing agent and precipitating agent to obtain mixed slurry containing molecular sieve and precipitates of group IIIB elements in the periodic table of elements; and drying, and roasting or not roasting to obtain molecular sieve modified by the group IIIB elements. A weight ratio of group IIIB elements calculated based on oxides to molecular sieve dry basis is equal to (0.3-10):100, a molar ratio of organic complexing agent to ions of group IIIB metals is equal to (0.3-10):1, and a molar ratio of dispersing agent to the ions of group IIIB metals is equal to (0.2-16):1. Also related to is the catalytic cracking catalyst containing the modified molecular sieve prepared according to the method. The molecular sieve prepared by the method or the catalytic cracking catalyst containing same has good activity stability and heavy metal pollution resistance.

15 Claims, No Drawings

(51) Int. Cl.
  *B01J 29/46* (2006.01)
  *B01J 37/02* (2006.01)
  *B01J 37/03* (2006.01)
  *B01J 37/04* (2006.01)
  *B01J 37/08* (2006.01)
  *C01B 39/38* (2006.01)

(52) U.S. Cl.
  CPC ......... *C10G 11/05* (2013.01); *B01J 2229/186* (2013.01); *B01J 2229/42* (2013.01); *C10G 2300/1033* (2013.01); *C10G 2300/1048* (2013.01)

(56) References Cited

U.S. PATENT DOCUMENTS

| | | | |
|---|---|---|---|
| 4,900,428 | A | 2/1990 | Mester |
| 5,232,675 | A | 8/1993 | Shu et al. |
| 2015/0298106 | A1 | 10/2015 | Ahmed |
| 2018/0229223 | A1* | 8/2018 | Sun .................. B01J 29/061 |

FOREIGN PATENT DOCUMENTS

| CN | 1111136 | C | | 6/2003 |
|---|---|---|---|---|
| CN | 1436728 | A | * | 8/2003 |
| CN | 1436728 | A | | 8/2003 |
| CN | 1159101 | C | | 7/2004 |
| CN | 1169717 | C | | 10/2004 |
| CN | 1201864 | C | | 5/2005 |
| CN | 1202007 | C | | 5/2005 |
| CN | 1209288 | C | | 7/2005 |
| CN | 1209442 | C | | 7/2005 |
| CN | 1247744 | C | | 3/2006 |
| CN | 101088613 | A | | 12/2007 |
| CN | 101385983 | A | | 3/2009 |
| CN | 100497175 | C | | 6/2009 |
| CN | 102019195 | A | | 4/2011 |
| CN | 103055916 | A | | 4/2013 |
| CN | 103055916 | A | * | 4/2013 |
| CN | 103058217 | A | | 4/2013 |
| CN | 105562060 | A | | 5/2016 |
| CN | 105562061 | C | | 5/2016 |

OTHER PUBLICATIONS

Notification Concerning Transmittal of International Preliminary Report on Patentability for International Application No. PCT/CN2016/093184, "Preparation Method For Modified Molecular Sieve And Modified Molecular Sieve-Containing Catalytic Cracking Catalyst", dated Feb. 15, 2018.

Office Action for U.S. Appl. No. 15/750,398, "Preparation Method For Modified Molecular Sieve And Modified Molecular Sieve-Containing Catalytic Cracking Catalyst" dated Dec. 17, 2020.

* cited by examiner

US 11,111,152 B2

PREPARATION METHOD FOR MODIFIED MOLECULAR SIEVE AND MODIFIED MOLECULAR SIEVE-CONTAINING CATALYTIC CRACKING CATALYST

This application is the U.S. National Stage of International Application No. PCT/CN2016/093184, filed Aug. 4, 2016, which designates the U.S., published in Chinese, and claims priority under 35 U.S.C. 119 or 365(c) to Chinese Application No. 201510475250.5, filed Aug. 5, 2015 and Chinese Application No. 201510475251.X filed Aug. 5, 2015. The entire teachings of the above applications are incorporated herein by reference.

TECHNICAL FIELD

The present invention relates to a preparation method of a molecular sieve and a catalytic cracking catalyst, in particular to a preparation method of a modified molecular sieve and a catalytic cracking catalyst containing the modified molecular sieve.

BACKGROUND OF ART

As the crude oil is becoming heavier and poorer, the efficient processing of heavy oil and blending residue become an urgent need for refining enterprises to increase their processing capacity and obtain higher profits. Catalytic cracking is the most important process for heavy oil processing, and it plays an important role in the heavy oil processing process in refinery and is the main source of profits for the refinery, owing to the significant advantages such as high conversion efficiency of heavy oil, high quality of products and non-hydrogen and low operating pressure. According to statistics, currently there are around 420 sets of catalytic cracking units in the world. The scale of a single set of catalytic cracking unit is up to 10 million tons/year with a total processing capacity of about 737 million tons, ranking the first place in the secondary processing.

Because the heavy oil and residue contain macromolecular compounds that tends to produce coke, such as resins and asphaltenes, and contain heavy metals such as nickel and vanadium, a nickel-vanadium content of 10000 μg/g on the catalytic cracking equilibrium catalyst is very common, and a heavy contamination up to 15000 μg/g is not rare. Vanadium seriously damages the structure of the active component molecular sieve of the catalyst in the high temperature and hydrothermal environment of the catalytic cracking, which decreases the catalytic activity and worsens the distribution of the catalytic cracking products. Therefore, there is a need to develop a molecular sieve with excellent activity, hydrothermal stability and heavy metal contamination resistance to satisfy the stringent requirements of catalyst performance for heavy oil and residue cracking.

In order to improve the activity and the stability of the molecular sieve, rare earths or phosphorus are generally used to modify the molecular sieve in the prior art. For example, CN1169717C discloses a method for modifying zeolite Y with rare earth ions and products thereof. The method uses NaY molecular sieve as the raw material, which is firstly subjected to ammonium exchange followed by hydrothermal treatment, treated with a solution containing $H^+$, $NH_4^+$ and $RE^{3+}$, and then subjected to washing, drying and calcination to obtain the modified molecular sieve product. CN1111136C discloses a preparation method of a Y-type molecular sieve containing phosphorus and rare earth, obtained by firstly exchanging NaY molecular sieve with rare earth ions and ammonium ions, calcining, and then reacting with phosphorous compound to incorporate 1 to 10 wt % of $P_2O_5$, followed by calcining. CN1209288 C discloses a preparation method of a faujasite zeolite containing phosphorus and rare earths, obtained by firstly exchanging the faujasite zeolite with ammonium compound and phosphorus compound, and then introducing a rare earth solution to the exchange slurry for further reaction, followed by filtering, washing, and then calcining. The zeolite-containing catalyst has good activity stability, high gasoline yield, low coke yield, high heavy oil cracking capacity and heavy metal contamination resistance. CN1026225 C discloses a preparation method of a rare earth Y molecular sieve, obtained by ion exchanging NaY molecular sieve with rare earth ions in an aqueous solution, followed by filtering, and calcining the cake in flowing steam. CN1069553 C discloses a method for preparing a rare earth Y-type molecular sieve, obtained by ion exchanging NaY molecular sieve with rare earth ions, filtering, calcining the cake, circulating 1 to 40% of the calcined product back to the next batch of rare earth exchange slurry to continue the above-described operation with the rest used as a REY molecular sieve product for the preparation of a catalyst, which are continuously carried out. CN103058217 A discloses a method for preparing a rare earth-containing Y molecular sieve by firstly subjecting NaY molecular sieve used as a raw material to ammonium exchange, and then hydrothermal treatment, treating with a mixed solution containing $H^+$, $NH_4^+$, $RE^{3+}$ and an organic solvent, separating the mother liquor, and calcining the filter cake to obtain a modified molecular sieve product. CN1159101 C discloses a method for preparing a rare earth-containing ultrastable Y zeolite, comprising mixing the ultrastable Y zeolite having a sodium oxide content of 3-5 wt % with a rare earth compound solution to obtain a slurry, grinding the slurry under shear stress of at least 10 $kg/cm^2$ for at least 1 minute to obtain a modified molecular sieve product. The zeolite prepared by the method has high hydrothermal stability, and sodium and heavy metal contamination resistance.

CN99105792.9 discloses a rare earth-containing molecular sieve and a preparation method thereof, comprising: mixing a rare earth molecular sieve containing 0.1-40 wt % of rare earths in terms of oxide with a solution of at least one substance of (I) and at least one substance of (II) at 25 to 120° C. for at least 0.1 hour; wherein (I) comprises an inorganic acid, an inorganic base, an organic acid or a reagent capable of forming a complex with aluminum, and (II) comprises a soluble ammonium salt, an organic acid salt and amine, alcohol, aldehyde and ketone; the pH value of the solution is 3 to 12. In the method, the molecular sieve is firstly loaded with the rare earth and then treated with the at least one substance of (I) and the at least one substance of (II), in order to obtain a framework of rare earth molecular sieve, in which the rare earth is present in the framework of the molecular sieve, replacing a part of the cations on the molecular sieve framework.

CN100497175C discloses a method for increasing the rare earth content of an ultrastable Y-type zeolite. The method comprises: sufficiently mixing the ultrastable Y-type zeolite and an acid solution having a concentration of 0.01-2N at a liquid-solid ratio of 4-20 in a temperature range of 20-100° C., treating for 10 to 300 minutes, washing, filtering, adding rare earth salt solution for rare earth ion exchange, followed by washing, filtering and drying to obtain the rare earth ultrastable Y zeolite with through cells and significantly increased rare earth content. The method firstly cleans the cell of Y zeolite with acid solution, and after filtration, the zeolite molecular sieve is exchanged with rare earth. The purpose of the method is to increase the rare earth content in the molecular sieve, in which the rare earth is present in the framework of the molecular sieve, replacing a part of the cations on the molecular sieve framework.

CN02103909.7 discloses a method for preparing a novel rare earth ultrastable Y molecular sieve containing vanadium-resistant component for catalytic cracking of heavy oil, wherein NaY-type molecular sieve is used as a raw material, and the chemical dealumination complexing agent contains oxalic acid or oxalate and mixture thereof, and at the same time, rare earth ions are introduced into the late stage of chemical dealumination reaction to form a rare earth precipitate, which is then subjected to a hydrothermal treatment to achieve the purpose of ultrastabilization and introduction of rare earth ions and independent phases of rare earth oxides. The method comprises: firstly treating the molecular sieve with the chemical dealumination complexing agent (oxalic acid and/or oxalate) to dealuminate the molecular sieve, and then forming a rare earth precipitate containing rare earth oxalate by using rare earth and a complexing agent. In the method, the chemical dealumination complexing agent (oxalic acid and/or oxalate) is capable of complexing with the aluminum in the molecular sieve but not with rare earths, and the particles of the rare earth precipitate formed by the method are large and the distribution in the molecular sieve is not uniform enough, therefore the heavy metal resistant effect is relatively poor.

CN101088613B discloses a method for preparing a REY molecular sieve, comprising contacting the NaY molecular sieve with an aqueous solution containing rare earth ions for exchange, contacting with an additional precipitating agent to precipitate a part of the rare earths on the molecular sieve, followed by hydrothermal treatment and finally contacting with an aqueous ammonium salt solution, wherein the precipitating agent is a soluble carbonate aqueous solution or an alkaline aqueous solution. The essence of the preparation method is to remove the $Na^+$ content in the NaY molecular sieve and simultaneously introduce the rare earth ions through rare earth exchange and ammonium salt exchange; and the method comprises: firstly subjecting the molecular sieve to rare earth exchange, and then precipitating a part of rare earths on the molecular sieve with an additional precipitating agent, filtering the molecular sieve, washing, and subjecting the filter cake to hydrothermal treatment, and ammonium exchange. In the preparation process, the rare earths are mainly loaded onto the molecular sieves in the form of ion exchange, and some rare earths that have not been exchanged on the molecular sieves are precipitated with the precipitating agent. The rare earth-containing Y-type molecular sieve prepared by this precipitation method forms rare earth precipitates and contain independent phases of rare earths, but the particles of the rare earth precipitates are large, which is not favorable for uniform dispersion on the molecular sieve surface, and not favorable for effective contact with heavy metals, timely capture of heavy metals, so its heavy metal contamination resistance is insufficient. Meanwhile, since its raw material is NaY, the filtration, washing, hydrothermal treatment, and ammonium exchange for sodium reduction after rare earth exchange will also cause the rare earth utilization rate to be greatly reduced.

In the process of catalytic cracking, the heavy metals such as nickel and vanadium in the raw oil are continuously deposited on the catalyst. Vanadium deposited on the catalyst forms vanadic acid in the environment of oxygen, high temperature and moisture in the regenerator, to destroy the structure of the active component, molecular sieve in the catalyst, resulting in the collapse of the crystal structure of the molecular sieve and the deactivation of the molecular sieve. The heavy metal, nickel deposited on the catalyst will participate in the reaction process as a dehydrogenation active center, thereby deteriorating the selectivity of the catalytic cracking reaction and generating more coke and dry gas. Therefore, it is necessary to timely capture and deactivate nickel and vanadium to convert them into stable and inert compounds, so as to improve the heavy metal contamination resistance of the molecular sieve. It has been found that the rare earth ions are subjected to ion exchange with the cation such as sodium of the molecular sieve, migrate into the molecular sieve and can improve the activity and the stability of the molecular sieve. However, once the ion exchanged rare earth comes into contact with vanadium, it tends to separate from the framework structure of the molecular sieve to form rare earth vanadate, deteriorating the structural stability of the molecular sieve instead. However, due to the difference in the existing positions and existing conditions, the rare earths existing in the form of independent phases can be used to capture heavy metals during the catalytic cracking reactions, and play a role of resistance to heavy metals. Therefore, the aforementioned rare earth molecular sieves prepared by rare earth ion exchange do not contain independent phases of rare earth, so its ability to resist heavy metal contamination is not enough.

The rare earth-containing Y-type molecular sieve prepared by the precipitation method, even though the rare earth precipitates are formed and the independent phases of rare earth are contained, has large particles of the rare earth precipitate, which is not favorable for the uniform dispersion on the surface of the molecular sieve and is not favorable for effective contact with the heavy metals and timely capture of heavy metals. Therefore, in order to satisfy the requirements of molecular sieve or molecular sieve catalysts for activity stability and heavy metal contamination resistance, despite recent molecular sieves or molecular sieve catalysts and their preparation techniques, there is still a need for molecular sieves or catalysts with excellent activity stability and heavy metal contamination resistance and new techniques for their preparation.

SUMMARY OF INVENTION

One of the main objects of the present invention is to provide a method for preparing a modified molecular sieve, wherein through the selection of one or more of a precipitating agent, an organic complexing agent and/or a dispersing agent, the particle size of the precipitate of Group IIIB element of the periodic table is controlled, the Group IIIB element of the periodic table is deposited on the molecular sieve, so that the prepared molecular sieve has excellent activity stability and heavy metal contamination resistance.

Another object of the present invention is to provide the modified molecular sieve prepared by the preparation method of the modified molecular sieve.

Another object of the present invention is to provide a catalytic cracking catalyst containing the modified molecular sieve, which has good heavy metal contamination resistance and good activity and stability.

According to a preparation method of the modified molecular sieve disclosed in the present invention, the preparation method comprises: mixing a molecular sieve slurry, a compound solution containing Group IIIB metal ion of the periodic table, an organic complexing agent and/or a dispersant and a precipitating agent to obtain a mixed slurry containing the precipitate of Group IIIB element of the periodic table and the molecular sieve, followed by drying and optionally calcining, to obtain the Group IIIB element-modified molecular sieve, wherein the weight ratio of the Group IIIB element in terms of oxide to the molecular sieve on dry basis is 0.3 to 10:100, the molar ratio of the organic complexing agent to the Group IIIB metal ion is 0.3 to 10:1, and the molar ratio of the dispersing agent to the Group IIIB metal ion is 0.2 to 16:1.

According to a preparation method of the modified molecular sieve disclosed in the present invention, the preparation method comprises: mixing the molecular sieve slurry, the compound solution containing Group IIIB metal ion of the periodic table, the organic complexing agent and/or the dispersant and the precipitating agent at a temperature of 5 to 100° C., preferably 5 to 60° C., more preferably 5 to 40° C. and stirring for at least 10 minutes, preferably 10 to 40 minutes to obtain the mixed slurry containing the precipitate of Group IIIB element of the periodic table and the molecular sieve, followed by drying and optionally calcining, to obtain the Group IIIB element-modified molecular sieve, wherein the weight ratio of the Group IIIB element in terms of oxide to the molecular sieve on dry basis is 0.3 to 10:100, preferably 0.3 to 8:100, the molar ratio of the organic complexing agent to the Group IIIB metal ion is 0.3 to 10:1, preferably 0.5 to 6:1, more preferably 1.0 to 4:1, and the molar ratio of the dispersing agent to the Group IIIB metal ion is 0.2 to 16:1, preferably 1 to 11:1, more preferably 2 to 7:1.

According to a preparation method of the modified molecular sieve disclosed in the present invention, the molecular sieve slurry is well known to those skilled in the art, that is, a mixture obtained after mixing and slurrying the molecular sieve and water.

According to a preparation method of the modified molecular sieve disclosed in the present invention, the obtained mixed slurry containing the precipitate of Group IIIB element of the periodic table and the molecular sieve is dried. Before drying, the mixed slurry may be filtered to speed up the drying rate, or not filtered. After drying, and optional calcination, the Group IIIB element-modified molecular sieve is obtained.

According to a preparation method of the modified molecular sieve disclosed in the present invention, the Group IIIB element is selected from one or more of scandium, yttrium, and lanthanide rare earth elements. The lanthanide rare earths include one or more of lanthanum, cerium, praseodymium, neodymium, promethium, samarium, europium, gadolinium, terbium, dysprosium, holmium, erbium, thulium, ytterbium, and lutetium. For example, it may be a mixture of various rare earth elements, or a single rare earth with high purity, generally lanthanum-rich rare earth, cerium-rich rare earth, pure lanthanum or pure cerium. The Group IIIB element-containing compound is selected from one or more of halides, nitrates, sulphates, oxides, and hydroxides of Group IIIB elements that are soluble in water or acids. The weight ratio of the precipitate of Group IIIB element in terms of oxide to the molecular sieve on dry basis is 0.3-10:100.

According to a preparation method of the modified molecular sieve disclosed in the present invention, the precipitating agent is a substance capable of chemically reacting with the Group IIIB metal ion in the system and making the product thereof slightly soluble or insoluble in the system, in a chemical precipitation reaction. Therefore, the kind and additional amount of the precipitating agent are well known to those skilled in the art, and one or more of the compounds that are capable of providing or generating hydroxide ions ($OH^-$), carbonate ions ($CO_3^{2-}$), bicarbonate ions ($HCO_3^-$), phosphate ions ($PO_4^{3-}$), hydrogen phosphate ions ($HPO_4^{2-}$), dihydrogen phosphate ions ($H_2PO_4^-$) and oxalate ions ($C_2O_4^{2-}$) can be used as the precipitating agent in the present invention, as long as the additional amount satisfies the molar ratio of the substances in the precipitation reaction.

According to a preparation method of the modified molecular sieve disclosed in the present invention, the precipitating agent is preferably one or more of oxalic acid, ammonium oxalate, ammonium carbonate, ammonium bicarbonate, carbon dioxide, aqueous ammonia, phosphoric acid, diammonium hydrogen phosphate, ammonium dihydrogen phosphate, ammonium phosphate and urea. The additional amount of ammonia depends on the pH value of the molecular sieve slurry, so that the pH value of the molecular sieve slurry is maintained within the range of 6.5 to 9.0; the additional amount of oxalic acid, ammonium oxalate, ammonium carbonate, ammonium bicarbonate, carbon dioxide, phosphoric acid, diammonium hydrogen phosphate, ammonium dihydrogen phosphate, ammonium phosphate and urea depends on the additional amount of Group IIIB element compounds, so that the weight ratio of the above precipitating agent to the compound of Group IIIB element (in terms of oxide) is 0.3 to 5:1.

According to a preparation method of the modified molecular sieve disclosed in the present invention, the organic complexing agent is selected from one or more of formic acid, acetic acid, adipic acid, citric acid, tartaric acid, benzoic acid, ethylenediamine tetraacetic acid, salicylic acid and salts thereof, acetylacetone, diethanolamine, and triethanolamine, preferably one or more of citric acid, ammonium citrate, ammonium dihydrogen citrate, diammonium hydrogen citrate, EDTA (ethylenediamine tetraacetic acid). The molar ratio of the organic complexing agent to the metal ion is 0.3 to 10:1.

According to a preparation method of the modified molecular sieve disclosed in the present invention, the dispersing agent is well known to those skilled in the art, and is a surfactant having both lipophilic and hydrophilic properties in the molecule, which can uniformly disperse solid particles that are insoluble in the liquid while preventing the sedimentation and agglomeration of the solid particles, and form a material needed for stabilizing the suspension. Its main function is to reduce the liquid-liquid and solid-liquid interfacial tension. The surfactants can also act as a dispersing agent; and the dispersing agent does not form precipitates with the Group IIIB metal ion. The dispersing agent is selected from one or more of monohydric or dihydric alcohol having 2 to 8 carbon atoms, polyethylene glycol, cellulose derivative, polyacrylamide and derivatives thereof, and guar gum. The molar ratio of the dispersing agent to the metal ion is 0.2 to 16:1.

According to a preparation method of the modified molecular sieve disclosed in the present invention, the cellulose derivative is typically one or more of carboxymethylcellulose sodium, methyl hydroxyethyl cellulose, and hydroxypropyl methyl cellulose.

According to a preparation method of the modified molecular sieve disclosed in the present invention, the monohydric or dihydric alcohol having 2 to 8 carbon atoms is well known to those skilled in the art of chemistry. For example, the monohydric or polyhydric alcohol having 2 carbon atoms is ethanol, or ethylene glycol, the monohydric or dihydric alcohol having 3 carbon atoms are isopropanol, n-propanol, 1,3-dipropanol, or 1,2-dipropanol. In the present invention, the monohydric or dihydric alcohol having 2 to 5 carbon atoms is preferable, and one or more of ethanol, ethylene glycol, isopropanol, butanol and methylpentanol are more preferable.

According to a preparation method of the modified molecular sieve disclosed in the present invention, the molecular sieve is a sodium-reduced molecular sieve, that is, a molecular sieve having a low sodium content, preferably $Na_2O$ mass content not more than 2%. The techniques for reducing the sodium oxide content of the molecular sieves are well known to those skilled in the art, typically sodium reduction by ammonium ion exchange. The ammonium salt is selected from one or more of ammonium sulfate, ammonium bisulfate, ammonium nitrate, ammonium chloride, ammonium carbonate, and ammonium bicarbonate. The ammonium salt is mainly used to exchange sodium on the molecular sieve, so that the exchanged molecular sieve has an acid catalytic activity. The molecular sieve is preferably selected from one or more of Y-type molecular sieve, β-molecular sieve, SAPO molecular sieve, ZSM molecular sieve and titania-silica molecular sieve; wherein the Y-type molecular sieve is selected from USY, REUSY, REHY, HY, $NH_4Y$, REY, and phosphorus-containing Y molecular sieves.

According to a preparation method of the modified molecular sieve disclosed in the present invention, the order for adding the molecular sieve slurry, the compound solution containing the Group IIIB metal ion of the periodic table, the organic complexing agent and/or the dispersing agent, and the precipitating agent is not particularly limited, as long as the molecular sieve is contained in the system of the mixed slurry, and the compound solution containing the Group IIIB metal ion of the periodic table, the organic complexing agent and/or the dispersing agent and the precipitating agent is added to satisfy the requirements of the present invention. According to a preparation method of the modified molecular sieve disclosed in the present invention, it is preferable that the mixing of the molecular sieve slurry, the compound solution containing the Group IIIB metal ion of the periodic table, the organic complexing agent and/or the dispersing agent and the precipitating agent is carried out by any one of:

Method 1: uniformly mixing the precipitating agent, the organic complexing agent and/or the dispersing agent with the molecular sieve slurry, adding the compound solution containing the Group IIIB metal ion of the periodic table and stirring for at least 10 minutes (when the precipitate agent, the organic complexing agent and/or the dispersing agent and the molecular sieve slurry are uniformly mixed, the order for adding each material and the number of additions are not limited, and a plurality of materials can be added at the same time, or different materials can be added without order limitation, as long as the mixture is uniform);

Method 2: uniformly mixing the compound solution containing the Group IIIB metal ion of the periodic table, the organic complexing agent and/or the dispersing agent with the molecular sieve slurry, adding the precipitating agent and stirring for at least 10 minutes (when the compound solution containing the Group IIIB metal ion of the periodic table, the organic complexing agent and/or the dispersing agent and the molecular sieve slurry are uniformly mixed, the way of addition and the number of additions for each material are not limited, as long as the mixture is uniform);

Method 3: mixing the precipitating agent with the compound solution containing the Group IIIB metal ion of the periodic table to form a precipitate of the Group IIIB metal ion, mixing the precipitate of the Group IIIB metal ion with one or more of the molecular sieve slurry and the organic complexing agent and/or dispersing agent, adding the remaining components to form a suspension containing the precipitate of the Group IIIB metal ion, the molecular sieve slurry, and the organic complexing agent and/or the dispersing agent, and stirring for at least 10 minutes. Method 1 and Method 2 are more preferably in the present invention, in which the precipitate formed upon mixing has a smaller particle size.

According to a preparation method of the modified molecular sieve disclosed in the present invention, the organic complexing agent and/or the dispersing agent play a role of dispersion and mainly reduce the particle size of the precipitate of Group IIIB element of the periodic table; the precipitating agent is mainly used to precipitate the Group IIIB element of the periodic table. The organic complexing agent, and the precipitating agent may be added directly for use, or used after dissolved in water to form a solution.

According to a preparation method of the modified molecular sieve disclosed in the present invention, the mixed slurry containing the precipitate of Group IIIB element of the periodic table and the molecular sieve is filtered or not filtered, dried, and optionally calcined, to obtain a Group IIIB element-modified molecular sieve. It is preferably subjected to calcination. The condition for the calcination process is calcining the molecular sieve in an atmosphere of 100% steam at a calcination temperature of 450-700° C. for a calcination time of 0.5 to 4 hours. During the high temperature calcination treatment of the precipitate of Group IIIB elements of the periodic table, a part of Group IIIB elements migrate to the molecular sieve by solid phase ion exchange, which can improve the molecular sieve activity and stabilize the crystal structure of the molecular sieve. The other part exists as an independent phase and plays a role of heavy metal contamination resistance. During the calcination, there are dealumination and silicon migration, so that the Si—O—Al on the molecular sieve framework is replaced by Si—O—Si. Since Si atoms (0.082 nm in diameter) are smaller than Al atoms (0.1 nm in diameter), the bond length becomes shorter (Si—O bond length of 0.161 nm, Al—O bond length of 0.174 nm), the unit cell shrinks, and the structure stability of the molecular sieve is improved. The calcination process is also accompanied by ion migration, wherein the ions of Group IIIB element migrate to the sites of S I and S II in the sodalite cage of Y-type molecular sieve to stabilize the crystal structure of the molecular sieve and provide the acid active center. The $Na^+$ ions in the sodalite cage migrate to the supercages, and escape from the molecular sieve in the subsequent ion exchange. As compared with a pure high-temperature calcination, the hydrothermal calcination in an atmosphere of 100% steam is more favorable for the migration of ions of Group IIIB elements and $Na^+$ ions, and more favorable for maintaining the crystal structure and unit cell shrinkage of the molecular sieve.

According to a preparation method of the modified molecular sieve disclosed in the present invention, the mixed slurry containing the precipitate of Group IIIB elements of the periodic table and the molecular sieve is dried by a common technique in the art, for example, it may be filtered and dried or directly spray-dried without filtration.

According to a preparation method of the modified molecular sieve disclosed in the present invention, during the modification process, the molecular sieve, the compound of Group IIIB element, the organic complexing agent and/or the dispersing agent and the precipitating agent are added together. Due to the presence of the organic complexing agent and/or the dispersing agent, the formed system provides a suitable reaction environment for the deposition of Group IIIB element on the molecular sieve, to facilitate the formation of ultrafine compound of Group IIIB element of the periodic table, which reduces the particle size of the precipitate of Group IIIB element, increases the outer surface and the degree of dispersion of the precipitate, and deposits the precipitate of Group IIIB element of the periodic table more uniformly on the molecular sieve. The catalyst prepared by using the molecular sieve prepared by the present invention contains the precipitate of Group IIIB element as a heavy metal passivating agent, which facilitates the timely and effective contact between the contaminating heavy metal and the contaminating heavy metal passivating agent and avoids the uneven distribution of the catalyst microsphere passivating agent and the local absence of the passivating agent in the microspheres or molecular sieve, so as to achieve the purpose of capturing heavy metals more effectively.

In the molecular sieve prepared by the preparation process of the present invention, Group IIIB element of the periodic table is present in the form of an independent phase or a mixed phase of independent phase/ion, which can improve the activity stability and heavy metal contamination resistance of the molecular sieve. The modified molecular sieve of the present invention has excellent activity, stability and stronger heavy metal contamination resistance property at the same time.

The present invention also provides a modified molecular sieve prepared according to the aforementioned preparation method of the present invention.

The present invention also provides a catalytic cracking catalyst containing a modified molecular sieve, which contains a catalytically effective amount of the modified molecular sieve prepared according to the aforementioned preparation method. The "catalytically effective amount" as used herein means the amount in which the modified molecular sieve plays a substantial role in the catalyst.

According to a catalytic cracking catalyst containing the modified molecular sieve disclosed in the present invention, it contains 10 to 55% on dry basis of the modified molecular sieve prepared according to the aforementioned preparation method, 10 to 80% of clay on dry basis, 0 to 40% of an inorganic oxide in terms of oxide and 5 to 40% of a binder in terms of oxide, based on 100% of the mass of the catalyst.

Preferably, according to a catalytic cracking catalyst containing the modified molecular sieve disclosed in the present invention, it contains 15 to 45% on dry basis of the modified molecular sieve prepared according to the aforementioned preparation method, 20 to 65% of clay on dry basis, 5 to 25% of an inorganic oxide in terms of oxide and 5 to 30% of a binder in terms of oxide, based on 100% of the mass of the catalyst.

According to a catalytic cracking catalyst containing the modified molecular sieve disclosed in the present invention, the clay is selected from one or more of the clays commonly used as a catalytic cracking catalyst component, such as one or more of kaolin, hydrous kaolin, metakaolin, acid-extracted kaolin, alkali-extracted kaolin, montmorillonite, diatomaceous earth, rectorite, halloysite, saponite, sepiolite, attapulgite, hydrotalcite, and bentonite clay, which are well-known to those skilled in the art.

According to a catalytic cracking catalyst containing the modified molecular sieve disclosed in the present invention, the inorganic oxide is not used as a binder, for example, the inorganic oxide is used in the form of a solid fine powder for the process of gelling the catalyst and maintains the solid state during the gelling process; the inorganic oxide is one or more of alumina, silica, titania, zirconia, or a mixture thereof. The alumina is selected from the various forms of alumina and/or hydrated alumina such as one or more of γ-alumina, η-alumina, θ-alumina, Boehmite, Gibbsite, and Bayreite, except pseudo-boehmite that can be acid-soluble and has a binder effect when soluble in acid.

According to a catalytic cracking catalyst containing the modified molecular sieve disclosed in the present invention, the binder is selected from one or more of binders commonly used in cracking catalysts, such as one or more of silica sol, aluminum sol, modified silica sol, modified aluminum sol, amorphous silica-aluminum gel, and pseudo-boehmite, preferably pseudo-boehmite and/or aluminum sol.

According to a catalytic cracking catalyst containing the modified molecular sieve disclosed in the present invention, the preparation method is well known to a person skilled in the art and can be carried out according to the preparation method of the existing cracking catalyst. These methods are described in detail in CN1247744C, CN1201864C, CN102019195B, CN103157507B, and CN1209442C, all of which are incorporated herein by reference. The preparation method of the catalytic cracking catalyst containing the modified molecular sieve provided by the present invention comprises: mixing and slurrying the modified molecular sieve, the clay, the inorganic oxide and the binder, and spray-drying to prepare the catalyst. The various components of the catalytic cracking catalyst may be mixed and slurried in a variety of ways; each component may separately form a material slurry and then be mixed and slurried; or 2 to 3 kinds of components may be mixed and then be slurried, then the remaining materials are prepared into 2 or 1 material slurry, mixed and slurried, prepared into a mixed slurry containing a plurality of components.

The preparation method of a catalytic cracking catalyst containing the modified molecular sieve disclosed in the present invention, comprises:
  (1) preparing the modified molecular sieve according to the aforementioned method of the present invention; preferably, the molecular sieve in the method being a sodium-reduced molecular sieve;
  (2) mixing and slurrying the modified molecular sieve obtained in the step (1), the clay, the inorganic oxide and the binder and spray-drying to prepare a catalyst.

According to a method for preparing a catalytic cracking catalyst containing the modified molecular sieve disclosed in the present invention, in the preparation method of the modified molecular sieve, when obtaining the mixed slurry containing the precipitate of Group IIIB element of the periodic table and the molecular sieve, the slurry may be used for the direct preparation of a catalytic cracking catalyst without any treatment of the slurry; or the slurry may be treated, such that the mixed slurry containing the precipitate of Group IIIB element of the periodic table and the molecular sieve is dried, optionally calcined, and then the modified molecular sieve is slurried, or the modified molecular sieve and other components are mixed and slurried together. When drying the mixed slurry, the drying is a common technique in the art, for example, it may be filtered and dried, or directly spray-dried without filtration.

The preparation method of a catalytic cracking catalyst containing the modified molecular sieve disclosed in the present invention may also have the following alternatives, comprising:
  (1) obtaining a mixed slurry containing a precipitate of Group IIIB element of the periodic table and a molecular sieve according to the aforementioned method; preferably, the mixed slurry containing the precipitate of Group IIIB element of the periodic table and the molecular sieve is a mixed slurry of the precipitate of Group IIIB element of the periodic table and a sodium-reduced molecular sieve;

(2) mixing and slurrying the mixed slurry containing the precipitate of Group IIIB element of the periodic table and the molecular sieve obtained in the step (1), the clay, the inorganic oxide and the binder and spray-drying to prepare the catalyst.

The preparation method of the catalyst disclosed in the present invention may further comprise the steps of calcining, washing, filtering and drying after spray-drying. The spray-drying, calcining, washing, filtering and drying belong to the prior art, which are not particularly limited in the present invention.

According to a catalytic cracking catalyst containing the modified molecular sieve disclosed in the present invention, in the preparation of the modified molecular sieve, the molecular sieve, a compound of the Group IIIB element, an organic complexing agent and/or a dispersing agent and a precipitating agent are added together. Due to the presence of the organic complexing agent and/or the dispersing agent, the formed system provides a suitable reaction environment for the deposition of Group IIIB element on the molecular sieve, to facilitate the formation of ultrafine compound of Group IIIB element of the periodic table, which reduces the particle size of the precipitate of Group IIIB element, increases the outer surface and the degree of dispersion of the precipitate, and deposits the precipitate of Group IIIB element of the periodic table more uniformly on the molecular sieve. The Group IIIB element of the periodic table is present in the form of an independent phase or a mixed phase of independent phase/ion, which can improve the activity stability and heavy metal contamination resistance of the molecular sieve. The catalyst prepared by using the molecular sieve contains the precipitate of Group IIIB element as the heavy metal passivating agent, which facilitates the timely and effective contact between the contaminating heavy metal and the contaminating heavy metal passivating agent and avoids the uneven distribution of the catalyst microsphere passivating agent and the local absence of the passivating agent in the microspheres or molecular sieve, so as to achieve the purpose of capturing heavy metals more effectively. The catalyst disclosed in the present invention has excellent activity, stability and stronger heavy metal contamination resistance; it is suitable for heavy oil catalytic cracking, and is particularly suitable for heavy oil catalytic cracking with high content of heavy metal vanadium. The heavy oil includes but is not limited to one or more of atmospheric residue, vacuum residue, vacuum gas oil, atmospheric gas oil, deasphalted oil and coker gas oil.

DETAILED DESCRIPTION

The present invention is further illustrated below by referring to the Examples, but the present invention is not limited to these examples.

(A) The Analytical and Test Method Used in Examples

1. Sodium oxide, yttrium oxide, rare earth content: using X-ray fluorescence analysis.

2. Crystallinity and unit cell constant of the molecular sieve: using X-ray diffraction analysis.

3. Particle size: using laser particle size analyzer method.

4. Determination of catalyst activity: performed on Model CSA-B catalyst evaluation device produced by Huayang company. The catalyst was preliminarily aged at 800° C. in 100% steam for 6 h or 17 h, and the activity of the catalyst was measured using Dagang light diesel oil as a raw material at a reaction temperature of 460° C., a reaction time of 70 s, a catalyst loading of 5.0 g and a ratio of oil to solvent of 3.2:1.

(B) Specifications of Raw Materials Used in the Examples

1. NaY molecular sieve, REUSY molecular sieve ($RE_2O_3$ content: 4.02%, $Na_2O$ content: 1.24%), $NH_4Y$ molecular sieve ($Na_2O$ content: 1.68%, subjected to hydrothermal calcination once), ZSM-5 molecular sieve ($Na_2O$ content: 0.10%), kaolin (ignition loss: 18.6%) or kaolin (ignition loss: 14.6%), diatomaceous earth (ignition loss: 15.4%), aluminum sol (containing 21.2 wt % of alumina) or aluminum sol (containing 19.4 wt % of alumina), pseudo-boehmite (ignition loss: 31.8%), boehmite (ignition loss: 17.0%), silica (white carbon black, ignition loss: 9.91%), ammonia (concentration: 18%), rare earth nitrate ($RE_2O_3$ 230.5 g/L): all of which are industrial products, from Lanzhou Petrochemical Company catalyst plant.

2. Ammonium sulfate, citric acid, ammonium citrate, ethylene glycol, ethanol, ammonium oxalate, ethylenediamine tetraacetic acid, urea, diammonium hydrogen phosphate, lanthanum nitrate, cerium nitrate, yttrium nitrate, methyl hydroxyethyl cellulose: all of which are chemical reagents.

3. Hydrochloric acid: concentration of 36%, chemical reagent.

4. Synthesized yttrium-containing Y-type molecular sieve slurry Y-1: the molecular sieve slurry was prepared by the following process: (1) adding 1000 g of NaY molecular sieve (on dry basis) to 7 L of deionized water, adding thereto 350 g of ammonium sulfate while stirring, adjusting the pH value of the slurry to 3.4 with hydrochloric acid, and stirring the mixture at a temperature of 85° C. for 1 hour, followed by filtering and washing to obtain a filter cake; mixing the filter cake (798 g on dry basis) with 102 g of yttrium nitrate and 2.2 L of deionized water, stirring for 0.5 h, spray-drying, and hydrothermally calcining in a calciner in an atmosphere of 100% steam at a calcination temperature of 600° C. for a calcination time of 2 hours; (2) mixing the molecular sieve obtained in the step (1), ammonium sulfate and water in a weight ratio of molecular sieve (dry basis):ammonium salt:water=1:0.3:5 to form a slurry; stirring at 75° C. and pH=3.5 for 1 hour to obtain the synthesized yttrium-containing Y-type molecular sieve slurry Y-1.

EXAMPLE 1

In the synthesized yttrium-containing Y-type molecular sieve slurry Y-1, 16 g of citric acid, 4 g of ethylene glycol, 54 g of yttrium nitrate and 128 g of ammonium oxalate were simultaneously added and stirred at a temperature of 55° C. for 20 minutes. The filter cake was filtered, washed, and calcined at 600° C. in an atmosphere of 100% steam for 2 hours to obtain the modified molecular sieve Z-1 of this Example.

600 g (on dry basis) of the molecular sieve Z-1 were added to 1.2 L of deionized water, and a molecular sieve slurry Z-1J was obtained after sand milling. 619 g of aluminum sol (containing 19.4 wt % of alumina), 1499 g of kaolin (ignition loss: 14.6%), 2.2 L of water were mixed and slurried, and then added to the molecular sieve slurry Z-1J, and stirring was continued for 30 minutes. After homogenization, spray-drying and molding, calcining, washing with water and drying were carried out to obtain the catalyst C-1 of this Example.

EXAMPLE 2

798 g (on dry basis) of REUSY molecular sieve, 16 g (on dry basis) of ZSM-5 molecular sieve and water were mixed and slurried in the weight ratio of the molecular sieve (on dry basis):water=1:3 to form a molecular sieve slurry, 110 g of ethylenediamine tetraacetic acid and 104 mL of rare earth nitrate were added thereto, the pH value of the molecular sieve slurry was adjusted with aqueous ammonia to be in the range of 7.5 to 8.0, 23 g of ethanol was further added and the mixture was stirred at room temperature (25° C.) for 30 minutes. The filter cake was filtered, washed and dried at 200° C. to obtain the modified molecular sieve Z-2 of this Example.

600 g (on dry basis) of the molecular sieve Z-2 were added to 1.2 L of deionized water, and a molecular sieve slurry Z-2J was obtained after sand milling. 619 g of aluminum sol (containing 19.4 wt % of alumina), 1513 g of diatomaceous earth, and 2.2 L of water were mixed and slurried, and then added to the molecular sieve slurry Z-2J, and stirring was continued for 30 minutes. After homogenization, spray-drying and molding, calcining, washing with water and drying were carried out to obtain the catalyst C-2 of this Example.

EXAMPLE 3

798 g (on dry basis) of REUSY molecular sieve and water were mixed in the weight ratio of the molecular sieve (on dry basis):water=1:3 to form a slurry, 155 g of urea and 85 g of lanthanum nitrate were sequentially added thereto and stirred at room temperature (25° C.), the pH value of the molecular sieve slurry was adjusted with aqueous ammonia to be in the range of 6.5 to 7.0, 14 g of ethylene glycol was further added and the mixture was stirred at room temperature (25° C.) for 1.5 hours, and then dried at 250° C. to obtain the modified molecular sieve Z-3 of this Example.

600 g (on dry basis) of the molecular sieve Z-3 were added to 1.2 L of deionized water, and the molecular sieve slurry Z-3J was obtained after sand milling. 1054 g of kaolin (ignition loss: 14.6%), 587 g of pseudo-boehmite, and 2.2 L of water were mixed and slurried. 60 mL of hydrochloric acid was added thereto and stirred for 1 hour. The molecular sieve slurry Z-3J was added and stirred for 15 minutes. Then 515 g of aluminum sol (containing 19.4 wt % of alumina) was added, and stirring was continued for 30 minutes to form a gel. After homogenization, spray-drying and molding, calcining, washing with water and drying were carried out to obtain the catalyst C-3 of the present invention.

EXAMPLE 4

798 g (on dry basis) of NH$_4$Y molecular sieve and water were mixed in the weight ratio of the molecular sieve (on dry basis):water=1:5 to form a slurry, 40 g of ammonium citrate, and 277 mL of rare earth nitrate were added thereto and stirred for 15 minutes, the pH value of the molecular sieve slurry was adjusted with aqueous ammonia to be in the range of 8.0 to 9.0, and stirring was continued for 1 hour at a temperature of 35° C. to obtain the modified molecular sieve Z-4 slurry of this Example. The modified molecular sieve Z-4 slurry was spray-dried to obtain the modified molecular sieve Z-4.

1030 g of kaolin (ignition loss: 14.6%), 440 g of pseudo-boehmite, 120 g of boehmite, and 2.2 L of water were mixed and slurried, 33 mL of hydrochloric acid was added thereto and stirred for 1 hour, and then 600 g (on dry basis) of the modified molecular sieve Z-4 slurry was added and stirred for 15 minutes. Then 619 g of aluminum sol (containing alumina of 19.4 wt %) was added and the stirring was continued for 30 minutes to form a gel. After homogenization, spray-drying and molding, calcining, washing with water and drying were carried out to obtain the catalyst C-4 of the present invention.

EXAMPLE 5

798 g (on dry basis) of NH$_4$Y molecular sieve and water were mixed in the weight ratio of the molecular sieve (on dry basis):water=1:3.5 to form a slurry, 70 g of diammonium hydrogen phosphate, and 64 g of cerium nitrate were added and stirred for 10 minutes, and then 30 g of ethylene glycol, and 15 g of ethanol were added and stirring was continued for 1 hour at a temperature of 15° C., the molecular sieve was spray-dried and hydrothermally calcinated in a calciner in an atmosphere of 100% steam at a temperature of 550° C. for a calcination time of 2.5 hours to obtain the modified molecular sieve Z-5 of this Example.

600 g (on dry basis) of molecular sieve Z-5 was added to 1.2 L of deionized water, and the molecular sieve slurry Z-5J was obtained after sand milling. 738 g of kaolin (ignition loss: 14.6%), 220 g of pseudo-boehmite, and 1.5 L of water were mixed and slurried. 19 mL of hydrochloric acid was added and stirred for 1 hour. Then the molecular sieve slurry Z-5J was added and stirred for 25 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the catalyst C-5 of the present invention.

EXAMPLE 6

798 g (on dry basis) of NH$_4$Y molecular sieve and water were mixed in the weight ratio of the molecular sieve (on dry basis):water=1:5 to form a slurry, 69.2 mL of rare earth nitrate was added and stirred for 10 minutes at a temperature of 25° C., Then 16 g of citric acid and 3 g of methyl hydroxyethyl cellulose were added and stirred for 10 minutes at a temperature of 25° C., and then 64 g of ammonium oxalate was added and stirring was continued for 15 minutes, the obtained molecular sieve was dried and hydrothermally calcined in a calciner in an atmosphere of 100% steam at a temperature of 650° C. for a calcination time of 2 hours to obtain the modified molecular sieve Z-6 of this Example.

500 g (on dry basis) of the molecular sieve Z-6 was added to 1.0 L of deionized water, and the molecular sieve slurry Z-6J was obtained after sand milling. 867 g of kaolin (ignition loss: 14.6%), 587 g of pseudo-boehmite, 222 g of silica, and 2.0 L of water were mixed and slurried. 50 mL of hydrochloric acid was added and stirred for 0.5 hour. Then the molecular sieve slurry Z-6J was added and stirred for 25 minutes, 870 g of aluminum sol (containing 19.4 wt % of alumina) was added and the stirring was continued for 30 minutes to form a gel. After homogenization, spray-drying and molding, calcining, washing with water and drying were carried out to obtain the catalyst C-6 of the present invention.

EXAMPLE 7

69.2 mL of rare earth nitrate, 0.5 L of water, and 64 g of ammonium oxalate were mixed and stirred at 25° C. for 10 minutes, then 798 g (on dry basis) of NH$_4$Y molecular sieve, 16 g of citric acid, 3 g of methyl hydroxyethyl cellulose and water were added. In the obtained mixed system, the weight ratio of the molecular sieve (on dry basis):water is 1:5, stirring was continued for 15 minutes, the obtained molecular sieve was dried and hydrothermally calcinated in a calciner in an atmosphere of 100% steam at a temperature of 650° C. for a calcination time of 2 hours to obtain the modified molecular sieve Z-7 of this Example.

500 g (on dry basis) of the molecular sieve Z-7 was added to 1.0 L of deionized water, and the molecular sieve slurry Z-7J was obtained after sand milling. 867 g of kaolin (ignition loss: 14.6%), 587 g of pseudo-boehmite, 222 g of silica, and 2.0 L of water were mixed and slurried. 50 mL of hydrochloric acid was added and stirred for 0.5 hour. Then the molecular sieve slurry Z-7J was added and stirred for 25 minutes, then 870 g of aluminum sol (containing 19.4 wt % of alumina) was added and the stirring was continued for 30 minutes to form a gel. After homogenization, spray-drying and molding, calcining, washing with water and drying were carried out to obtain the catalyst C-7 of the present invention.

COMPARATIVE EXAMPLE 1

In the synthesized yttrium-containing Y-type molecular sieve slurry Y-1, 16 g of citric acid, 4 g of ethylene glycol, and 54 g of yttrium nitrate were added and stirred at a temperature of 55° C. for 20 minutes. The filter cake was filtered, washed, and calcined at 600° C. in an atmosphere of 100% steam for 2 hours to obtain the comparative molecular sieve DZ-1.

600 g (on dry basis) of the molecular sieve DZ-1 was added to 1.2 L of deionized water, and the molecular sieve slurry DZ-1J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-1J was added and stirred for 30 minutes. After homogenization, spray-drying and molding, calcining, washing with water and drying were carried out to obtain the comparative catalyst DC-1 containing the comparative molecular sieve DZ-1.

COMPARATIVE EXAMPLE 2

In the synthesized yttrium-containing Y-type molecular sieve slurry Y-1, 54 g of yttrium nitrate and 128 g of ammonium oxalate were added and stirred at a temperature of 55° C. for 20 minutes. The filter cake was filtered, washed, and calcined at 600° C. in an atmosphere of 100% steam for 2 hours to obtain the comparative molecular sieve DZ-2.

600 g (on dry basis) of the molecular sieve DZ-2 was added to 1.2 L of deionized water, and the molecular sieve slurry DZ-2J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-2J was added and stirred for 30 minutes. After homogenization, spray-drying and molding, calcining, washing with water and drying were carried out to obtain the comparative catalyst DC-2 containing the comparative molecular sieve DZ-2.

COMPARATIVE EXAMPLE 3

The synthesized yttrium-containing Y-type molecular sieve slurry Y-1 was stirred at a temperature of 55° C. for 20 minutes. The filter cake was filtered, washed, and calcined at 600° C. in an atmosphere of 100% steam for 2 hours to obtain the comparative molecular sieve DZ-3.

600 g (on dry basis) of the molecular sieve DZ-3 was added to 1.2 L of deionized water, and the molecular sieve slurry DZ-3J was obtained after sand milling. 619 g of aluminum sol (containing 19.4 wt % of alumina), 1499 g of kaolin (ignition loss: 14.6%), and 2.2 L of water were mixed and slurried. Then the molecular sieve slurry DZ-3J was added and stirred for 30 minutes. After homogenization, spray-drying and molding, calcining, washing with water and drying were carried out to obtain the comparative catalyst DC-3 containing the comparative molecular sieve DZ-3.

COMPARATIVE EXAMPLE 4

According to the preparation method of a molecular sieve containing rare earth disclosed in Chinese patent CN99105792.9: 798 g (on dry basis) of REUSY molecular sieve, 16 g (on dry basis) of ZSM-5 molecular sieve and water were mixed and slurried in the weight ratio of the molecular sieve (on dry basis):water=1:3 to form a molecular sieve slurry, 110 g of ethylenediamine tetraacetic acid was added, and the pH value of the molecular sieve slurry was adjusted with aqueous ammonia to be in the range of 7.5 to 8.0. 23 g of ethanol was added, and stirred at room temperature (25° C.) for 30 minutes. The filter cake was filtered, washed, and dried at 200° C. to obtain the comparative molecular sieve DZ-4.

600 g (on dry basis) of the molecular sieve DZ-4 was added to 1.2 L of deionized water, and the molecular sieve slurry DZ-4J was obtained after sand milling. 619 g of aluminum sol (containing 19.4 wt % of alumina), 1513 g of diatomaceous earth, and 2.2 L of water were mixed and slurried. Then the molecular sieve slurry DZ-4J was added and stirred for 30 minutes. After homogenization, spray-drying and molding, calcining, washing with water and drying were carried out to obtain the comparative catalyst DC-4 containing the comparative molecular sieve DZ-4.

COMPARATIVE EXAMPLE 5

798 g (on dry basis) of REUSY molecular sieve and water were mixed in the weight ratio of molecular sieve (on dry basis):water=1:3 to form a slurry, 85 g of lanthanum nitrate was added, and stirred at room temperature (25° C.), and the pH value of the molecular sieve slurry was adjusted with aqueous ammonia to be in the range of 6.5 to 7.0 and the stirring was continued at room temperature (25° C.) for 1.5 hours. It was dried at 250° C. to obtain the comparative molecular sieve DZ-5.

600 g (on dry basis) of the molecular sieve DZ-5 was added to 1.2 L of deionized water, and the molecular sieve slurry DZ-5J was obtained after sand milling. 1054 g of kaolin (ignition loss: 14.6%), 587 g of pseudo-boehmite, and 2.2 L of water were mixed and slurried. 60 mL of hydrochloric acid was added and stirred for 1 hour. Then the molecular sieve slurry DZ-5J was added and stirred for 15 minutes. 515 g of aluminum sol (containing 19.4 wt % of alumina) was added and stirring was continued for 30 minutes to form a gel. After homogenization, spray-drying and molding, calcining, washing with water and drying were carried out to obtain the comparative catalyst DC-5 containing the comparative molecular sieve DZ-5.

COMPARATIVE EXAMPLE 6

798 g (on dry basis) of $NH_4Y$ molecular sieve and water were mixed in the weight ratio of the molecular sieve (on dry basis):water=1:5 to form a slurry, and stirred for 15 minutes, stirring was continued at a temperature of 35° C. for 1 hour to obtain the comparative molecular sieve DZ-6 slurry. The comparative molecular sieve DZ-6 slurry was spray-dried to obtain the comparative molecular sieve DZ-6.

1030 g of kaolin (ignition loss: 14.6%), 440 g of pseudo-boehmite, 120 g of boehmite, and 2.2 L of water were mixed and slurried. 33 mL of hydrochloric acid was added and stirred for 1 hour. Then 600 g (on dry basis) of the molecular sieve DZ-6 slurry was added and stirred for 15 minutes. 619 g of aluminum sol (containing 19.4 wt % of alumina) was added and stirring was continued for 30 minutes to form a gel. After homogenization, spray-drying and molding, calcining, washing with water and drying were carried out to obtain the comparative catalyst DC-6 containing the comparative molecular sieve DZ-6.

COMPARATIVE EXAMPLE 7

798 g (on dry basis) of $NH_4Y$ molecular sieve and water were mixed in the weight ratio of the molecular sieve (on dry basis):water=1:3.5 to form a slurry, 70 g of diammonium hydrogen phosphate, and 64 g of cerium nitrate were added and stirred for 10 minutes, stirring was continued at a temperature of 15° C. for 1 hour, it was spray-dried and the obtained molecular sieve was hydrothermally calcinated in a calciner in an atmosphere of 100% steam at a temperature of 550° C. and a calcination time of 2.5 hours to obtain the comparative molecular sieve DZ-7.

600 g (on dry basis) of molecular sieve DZ-7 was added to 1.2 L of deionized water, after sanding treatment to obtain the molecular sieve slurry DZ-7J. 738 g of kaolin (ignition loss: 14.6%), 220 g of pseudo-boehmite, 1.5 L of water were mixed and slurried. 19 mL of hydrochloric acid was added and stirred for 1 hour. Then the molecular sieve slurry DZ-7J was added and stirred for 25 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-7 containing the comparative molecular sieve DZ-7.

COMPARATIVE EXAMPLE 8

According to a method for increasing rare earth content of the ultrastable Y-type zeolite disclosed in Chinese patent CN200510114495.1, 798 g (on dry basis) of $NH_4Y$ molecular sieve was calcined in an atmosphere of 100% steam at 600° C. for 1.5 hours to obtain an ultrastable Y molecular sieve. The ultrastable Y molecular sieve and water were mixed in the weight ratio of the molecular sieve (on dry basis):water=1:5 to form a slurry, 40 g of ammonium citrate was added and stirred at 35° C. for 1 hour, then it was washed and filtered and the filter cake was removed. The filter cake was mixed in the weight ratio of the molecular sieve (on dry basis):water=1:5, stirred and then 277 mL of rare earth nitrate was added thereto, and stirring was continued at 35° C. for 1 hour. It was filtered and dried to obtain the comparative molecular sieve DZ-8.

600 g (on dry basis) of the molecular sieve DZ-8 was added to 1.5 L of deionized water, and the molecular sieve slurry DZ-8J was obtained after sand milling. 1030 g of kaolin (ignition loss: 14.6%), 440 g of pseudo-boehmite, 120 g of boehmite, and 2.2 L of water were mixed and slurried. 50 mL of hydrochloric acid was added and stirred for 1 hour. Then the molecular sieve slurry DZ-8J was added and stirred for 15 minutes, then 619 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-8 containing the comparative molecular sieve DZ-8.

COMPARATIVE EXAMPLE 9

According to a method for preparing a novel rare earth ultrastable Y molecular sieve containing a vanadium-resistant component for catalytic cracking of heavy oil disclosed in Chinese Patent CN02103909.7, 798 g (on dry basis) of $NH_4Y$ molecular sieve and water were mixed in the weight ratio of the molecular sieve (on dry basis):water=1:5 to form a slurry, 64 g of ammonium oxalate was added and stirred at a temperature of 25° C. for 0.5 hour. Then 69.2 mL of rare earth nitrate was added and further stirred sufficiently for 15 minutes. It was filtered and washed with water, and the obtained molecular sieve was hydrothermally calcined in a calciner in an atmosphere of 100% steam at a temperature of 650° C. for a calcination time of 2 hours to obtain the comparative molecular sieve DZ-9.

500 g (on dry basis) of the molecular sieve DZ-9 was added to 1.0 L of deionized water, and the molecular sieve slurry DZ-9J was obtained after sand milling. 867 g of kaolin (ignition loss: 14.6%), 587 g of pseudo-boehmite, 222 g of silica, and 2.0 L of water were mixed and slurried. 50 mL of hydrochloric acid was added and stirred for 0.5 hour. Then the molecular sieve slurry DZ-9J was added and stirred for 25 minutes, then 870 g of aluminum sol (containing 19.4 wt % of alumina) was added and the stirring was continued for 30 minutes to form a gel. After homogenization, spray-drying and molding, calcining, washing with water and drying were carried out to obtain the comparative catalyst DC-9 containing the comparative molecular sieve DZ-9.

Physical and chemical properties of the molecular sieves Z-1 to Z-7 prepared in Examples 1 to 7 and the molecular sieves DZ-1 to DZ-9 prepared in Comparative Examples 1 to 9 were analyzed and tested. The results obtained are shown in Table 1:

TABLE 1

| | Properties of the modified molecular sieves | | | | |
|---|---|---|---|---|---|
| Item | Sodium oxide wt % | Yttrium oxide wt % | Rare earth oxide wt % | Crystallinity wt % | Unit cell constant nm |
| The molecular sieve Z-1 prepared by Example 1 | 1.54 | 5.80 | — | 69 | 2.457 |
| The molecular sieve Z-2 prepared by Example 2 | 1.20 | — | 7.10 | 47 | 2.457 |

TABLE 1-continued

Properties of the modified molecular sieves

| Item | Sodium oxide wt % | Yttrium oxide wt % | Rare earth oxide wt % | Crystallinity wt % | Unit cell constant nm |
|---|---|---|---|---|---|
| The molecular sieve Z-3 prepared by Example 3 | 1.21 | — | 8.05 | 45 | 2.457 |
| The molecular sieve Z-4 prepared by Example 4 | 1.56 | — | 7.98 | 43 | 2.454 |
| The molecular sieve Z-5 prepared by Example 5 | 1.52 | — | 3.02 | 53 | 2.452 |
| The molecular sieve Z-6 prepared by Example 6 | 1.61 | — | 1.98 | 56 | 2.450 |
| The molecular sieve Z-7 prepared by Example 7 | 1.61 | — | 1.98 | 55 | 2.450 |
| The molecular sieve DZ-1 prepared by Comparative Example 1 | 1.46 | 4.31 | — | 67 | 2.454 |
| The molecular sieve DZ-2 prepared by Comparative Example 2 | 1.51 | 5.78 | — | 68 | 2.457 |
| The molecular sieve DZ-3 prepared by Comparative Example 3 | 1.60 | 2.65 | — | 67 | 2.451 |
| The molecular sieve DZ-4 prepared by Comparative Example 4 | 1.19 | — | 4.02 | 51 | 2.455 |
| The molecular sieve DZ-5 prepared by Comparative Example 5 | 1.21 | — | 8.01 | 45 | 2.457 |
| The molecular sieve DZ-6 prepared by Comparative Example 6 | 1.65 | — | — | 53 | 2.453 |
| The molecular sieve DZ-7 prepared by Comparative Example 7 | 1.51 | — | 2.98 | 52 | 2.452 |
| The molecular sieve DZ-8 prepared by Comparative Example 8 | 1.32 | — | 6.40 | 44 | 2.456 |
| The molecular sieve DZ-9 prepared by Comparative Example 9 | 1.48 | — | 1.81 | 54 | 2.450 |

The results in Table 1 show that, as compared with the molecular sieve DZ-1 prepared by Comparative Example 1, the sodium oxide content, crystallinity, and unit cell constant of the molecular sieve Z-1 prepared by Example 1 are comparable to the comparative molecular sieve DZ-1, but the yttrium oxide content of the molecular sieve is much higher than DZ-1 (1.49 wt % higher), indicating that the precipitating agent is indispensable in the preparation process of the modified molecular sieve of the present invention, which facilitates the precipitation of Group IIIB element of the periodic table on the molecular sieve. As compared with the molecular sieve Z-4 prepared by Example 4, the molecular sieve DZ-8 prepared by Comparative Example 8 has a low rare earth content in the molecular sieve and a low utilization of rare earth, since the filtration is carried out after the rare earth ion exchange, and there is a phenomenon that the rare earth that has not been exchanged to the molecular sieve is lost to the filtrate. The rare earth contained in the comparative molecular sieve DZ-8 enters the molecular sieve through ion exchange. Such rare earth renders the unit cells of the molecular sieve uneasy to shrink in the hydrothermal calcination process, so its unit cell constant is higher than that of the molecular sieve Z-4 prepared by Example 4. In addition, as compared with the molecular sieve Z-4 prepared by Example 4, the molecular sieve DZ-8 prepared by Comparative Example 8 incorporates the filtration treatment process of the molecular sieve, and the preparation process is relatively complicated. As compared with the molecular sieve Z-6 prepared by Example 6, the molecular sieve DZ-9 prepared by Comparative Example 9 is also problematic in that the rare earth is lost and the molecular sieve preparation process is relatively complicated, due to the filtration after the addition of rare earth to the molecular sieve. In the process of preparing molecular sieve Z-6 by Example 6, ammonium oxalate is mainly used as the precipitating agent for rare earth, but in the process of preparing molecular sieve DZ-9 by Comparative Example 9, ammonium oxalate firstly acts as a dealuminating agent to remove aluminum on the molecular sieve, and then reacts with the rare earth to precipitate the rare earth.

In order to investigate the cracking activity and hydrothermal stability of the molecular sieves, the molecular sieves Z-1 to Z-7 prepared by Examples 1 to 7 and the molecular sieves DZ-1 to DZ-9 prepared by Comparative Examples 1 to 9 were respectively used, 5% (in terms of alumina) of aluminum sol (containing 21.2 wt % of alumina) binder, 30% of the molecular sieve (on dry basis), 65% of kaolin (ignition loss: 18.6%, on dry basis) and a suitable amount of deionized water were mixed evenly, homogenized, dried, crushed and sieved. 20 to 40 mesh particles were selected to test the activity of the catalyst after 17 hours of steam aging respectively. The test results are shown in Table 2.

In order to investigate the heavy metal contamination resistance of the molecular sieves, the above 20 to 40 mesh particles were impregnated with 5000 μg/g of V, and 3000 μg/g of Ni (relative to the catalyst particles) by incipient-wetness impregnation method. The vanadium and nickel-contaminated particles were treated under the condition of 800° C. and 100% steam for 6 h. The activity of vanadium and nickel-contaminated catalyst after 6 h steam aging was tested. The test results are shown in Table 2:

TABLE 2

The activity and heavy metal resistance of the catalysts prepared by the modified molecular sieves

| Item | Activity after 17 h steam aging, wt % | Activity after vanadium and nickel contamination and 6 h steam aging, wt % | Activity preservation rate R1, wt % |
|---|---|---|---|
| Catalyst containing the molecular sieve Z-1 prepared by Example 1 | 69 | 55 | 80 |
| Catalyst containing the molecular sieve Z-2 prepared by Example 2 | 61 | 50 | 82 |
| Catalyst containing the molecular sieve Z-3 prepared by Example 3 | 62 | 52 | 84 |
| Catalyst containing the molecular sieve Z-4 prepared by Example 4 | 58 | 50 | 86 |
| Catalyst containing the molecular sieve Z-5 prepared by Example 5 | 50 | 39 | 78 |
| Catalyst containing the molecular sieve Z-6 prepared by Example 6 | 45 | 38 | 84 |
| Catalyst containing the molecular sieve Z-7 prepared by Example 7 | 45 | 37 | 82 |
| Catalyst containing the molecular sieve DZ-1 prepared by Comparative Example 1 | 64 | 45 | 70 |
| Catalyst containing the molecular sieve DZ-2 prepared by Comparative Example 2 | 69 | 52 | 75 |
| Catalyst containing the molecular sieve DZ-3 prepared by Comparative Example 3 | 58 | 41 | 71 |
| Catalyst containing the molecular sieve DZ-4 prepared by Comparative Example 4 | 51 | 35 | 69 |
| Catalyst containing the molecular sieve DZ-5 prepared by Comparative Example 5 | 60 | 45 | 75 |
| Catalyst containing the molecular sieve DZ-6 prepared by Comparative Example 6 | 38 | 27 | 71 |
| Catalyst containing the molecular sieve DZ-7 prepared by Comparative Example 7 | 50 | 36 | 72 |
| Catalyst containing the molecular sieve DZ-8 prepared by Comparative Example 8 | 60 | 47 | 78 |
| Catalyst containing the molecular sieve DZ-9 prepared by Comparative Example 9 | 44 | 34 | 77 |

In Table 2, the activity preservation rate R1 is used to characterize the heavy metal contamination resistance of the molecular sieve. Definition: activity preservation rate R1=activity after vanadium and nickel contamination and 6 h steam aging/activity after 17 h steam aging×100%.

The results in table 2 show that as compared with the molecular sieve DZ-1 to DZ-9 prepared by Comparative Examples 1 to 9, the catalysts prepared using the molecular sieves Z-1 to Z-7 prepared by Examples 1 to 7 of the present invention as the active component all have improved activity preservation rate R1, indicating that the modified molecular sieve of the present invention has a stronger vanadium and nickel contamination resistance.

As compared with the molecular sieve DZ-1 prepared by Comparative Example 1, the catalyst prepared by using the molecular sieve Z-1 prepared by Example 1 of the present invention as an active component has a significantly higher (by 5%) 17 h activity than the comparative catalyst containing the molecular sieve prepared in Comparative Example 1. When the catalyst was contaminated by vanadium and nickel, the catalyst prepared by using the molecular sieve Z-1 prepared by Example 1 of the present invention as an active component has the activity after vanadium and nickel contamination and 6 h steam aging significantly higher by 10% than that of the comparative catalyst (the catalyst containing the molecular sieve DZ-1 prepared by Comparative Example 1), and the activity preservation rate R1 increased by 10%, indicating that the molecular sieve of the present invention containing the precipitated yttrium has a higher activity stability and resistance to vanadium, nickel contamination. As compared with the molecular sieve DZ-2 prepared by Comparative Example 2, the catalyst prepared by using the molecular sieve Z-1 prepared by Example 1 of the present invention as the active component has the 17 h activity comparable to that of the comparative catalyst containing the molecular sieve prepared in Comparative Example 2, but when the catalyst is contaminated with vanadium and nickel, the catalyst prepared by using the molecular sieve Z-1 prepared by Example 1 of the present invention as an active component has the activity after vanadium and nickel contamination and 6 h steam aging significantly higher by 3% than that of the comparative catalyst (the catalyst containing the molecular sieve DZ-2 prepared by Comparative Example 2), and the activity preservation rate R1 increased by 5%, indicating that the molecular sieve containing the precipitated yttrium prepared by using the organic complexing agent and the dispersing agent according to the present invention has a higher resistance to vanadium and nickel contamination. As compared with the molecular sieve DZ-3 prepared by Comparative Example 3, the catalyst prepared by using the molecular sieve Z-1 prepared by Example 1 of the present invention as an active component has the 17 h activity significantly higher by 11% than that of the comparative catalyst containing the molecular sieve DZ-3 prepared by Comparative Example 3; when the catalysts are contaminated with vanadium and nickel, the catalyst prepared by using the molecular sieve Z-1 prepared by Example 1 of the present invention as an active component has the activity after vanadium and nickel contamination and 6 h steam aging significantly higher by 14% than that of the comparative catalyst (the catalyst containing the molecular sieve DZ-3 prepared by Comparative Example 3), and the activity preservation rate R1 increased by 9%, indicating that the molecular sieve of the present invention containing the precipitated yttrium has higher activity stability and resistance to vanadium and nickel contamination. As compared with the molecular sieve DZ-4 prepared by Comparative Example 4, the catalyst prepared by using the molecular sieve Z-2 prepared by Example 2 of the present invention as an active component has the 17 h activity significantly higher by 10% than that of the comparative catalyst containing the molecular sieve prepared by Comparative Example 4; when the catalysts are contaminated with vanadium and nickel, the catalyst prepared by using the molecular sieve Z-2 prepared by Example 2 of the present invention as an active component has the activity after vanadium and nickel contamination and 6 h steam aging significantly higher by 15% than that of the comparative catalyst (the catalyst containing the molecular sieve DZ-4 prepared by Comparative Example 4), and the activity preservation rate R1 increased by 13%, indicating that the molecular sieve catalyst of the present invention containing the precipitated rare earth has higher activity stability and resistance to vanadium and nickel contamination.

As compared with the molecular sieve DZ-5 prepared by Comparative Example 5, the catalyst prepared by using the molecular sieve Z-3 prepared by Example 3 of the present invention as an active component has the 17 h activity higher by 2% than that of the comparative catalyst containing the molecular sieve prepared by Comparative Example 5; when the catalysts are contaminated with vanadium and nickel, the catalyst prepared by using the molecular sieve Z-3 prepared by Example 3 of the present invention as an active component has the activity after vanadium and nickel contamination and 6 h steam aging significantly higher by 7% than that of the comparative catalyst (the catalyst containing the molecular sieve DZ-5 prepared by Comparative Example 5), and the activity preservation rate R1 increased by 9%, indicating that the molecular sieve catalyst prepared by using the dispersing agent and urea and aqueous ammonia precipitating agent has higher activity stability and resistance to vanadium and nickel contamination than the molecular sieve prepared by the precipitation technique using aqueous ammonia only.

As compared with the molecular sieve DZ-6 prepared by Comparative Example 6, the catalyst prepared by using the molecular sieve Z-4 prepared by Example 4 of the present invention as an active component has the 17 h activity significantly higher by 20% than that of the comparative catalyst containing the molecular sieve prepared by Comparative Example 6; when the catalysts are contaminated with vanadium and nickel, the catalyst prepared by using the molecular sieve Z-4 prepared by Example 4 of the present invention as an active component has the activity after vanadium and nickel contamination and 6 h steam aging significantly higher by 23% than that of the comparative catalyst (the catalyst containing the molecular sieve DZ-6 prepared by Comparative Example 6), and the activity preservation rate R1 increased by 15%, indicating that the molecular sieve prepared by the present invention has higher activity stability and resistance to vanadium and nickel contamination than the molecular sieve without the precipitated rare earth.

As compared with the molecular sieve DZ-7 prepared by Comparative Example 7, the catalyst prepared by using the molecular sieve Z-5 prepared by Example 5 of the present invention as an active component has the 17 h activity comparable to that of the comparative catalyst containing the molecular sieve prepared by Comparative Example 7; when the catalysts are contaminated with vanadium and nickel, the catalyst prepared by using the molecular sieve Z-5 prepared by Example 5 of the present invention as an active component has the activity after vanadium and nickel contamination and 6h steam aging higher by 3% than that of the comparative catalyst (the catalyst containing the molecular sieve DZ-7 prepared by Comparative Example 7), and the activity preservation rate R1 increased by 6%, indicating that the molecular sieve prepared by using the dispersing agent of the present invention has higher activity stability and resistance to vanadium and nickel contamination than the molecular sieve prepared by the precipitation technique using rare earth phosphate without dispersing agent.

As compared with the molecular sieve DZ-8 prepared by Comparative Example 8, when the catalysts are contaminated with vanadium and nickel, the catalyst prepared by using the molecular sieve Z-4 prepared by Example 4 of the present invention as an active component has the activity after vanadium and nickel contamination and 6 h steam aging significantly higher by 3% than that of the comparative catalyst (the catalyst containing the molecular sieve DZ-8 prepared by Comparative Example 8), and the activity preservation rate R1 increased by 8%, indicating that the molecular sieve prepared by the present invention has higher activity stability and resistance to vanadium and nickel contamination than the molecular sieve without the precipitated rare earth.

As compared with the molecular sieve DZ-9 prepared by Comparative Example 9, when the catalysts are contaminated with vanadium and nickel, the catalysts prepared by using the molecular sieve Z-6 and Z-7 prepared by Examples 6 and 7 of the present invention as an active component respectively have the activity after vanadium and nickel contamination and 6 h steam aging significantly higher by 4% than that of the comparative catalyst (the catalyst containing the molecular sieve DZ-9 prepared by Comparative Example 9), and the activity preservation rate R1 increased by 7% and 5% respectively, indicating that the molecular sieve prepared by using the complexing agent and the dispersing agent according to the present invention has higher activity stability and resistance to vanadium and nickel contamination than the molecular sieve prepared by the method of Chinese patent CN02103909.7 in the prior art.

In order to further investigate the cracking activity and the hydrothermal stability of the catalysts, the catalysts C-1 to C-7 prepared by Examples 1 to 7 and the comparative catalysts DC-1 to DC-9 prepared by Comparative Examples 1 to 9 were respectively tested for the activity of catalysts after 17 h steam aging. The test results are shown in Table 3.

In order to investigate the heavy metal contamination resistance of the catalysts, the catalysts C-1 to C-7 and the comparative catalysts DC-1 to DC-9 were respectively impregnated with 5000 μg/g of V, and 3000 μg/g of Ni (relative to the catalysts) by incipient-wetness impregnation method. The vanadium and nickel-contaminated catalysts were treated under the condition of 800° C. and 100% steam for 6 h, and tested for the activity of vanadium and nickel-contaminated catalyst after 6 h steam aging. The test results are shown in Table 3:

TABLE 3

Activity and heavy metal resistance of the catalysts

| Item | Activity after 17 h steam aging, wt % | Activity after vanadium and nickel contamination and 6 h steam aging, wt % | Activity preservation rate R1, wt % |
| --- | --- | --- | --- |
| Catalyst C-1 prepared in Example 1 | 71 | 59 | 83 |
| Catalyst C-2 prepared in Example 2 | 64 | 54 | 84 |
| Catalyst C-3 prepared in Example 3 | 66 | 57 | 86 |
| Catalyst C-4 prepared in Example 4 | 61 | 54 | 88 |
| Catalyst C-5 prepared in Example 5 | 58 | 47 | 81 |
| Catalyst C-6 prepared in Example 6 | 45 | 39 | 87 |
| Catalyst C-7 prepared in Example 7 | 45 | 38 | 84 |
| Comparative catalyst DC-1 prepared in Comparative Example 1 | 67 | 48 | 72 |
| Comparative catalyst DC-2 prepared in Comparative Example 2 | 71 | 54 | 76 |
| Comparative catalyst DC-3 prepared in Comparative Example 3 | 60 | 43 | 72 |
| Comparative catalyst DC-4 prepared in Comparative Example 4 | 54 | 38 | 70 |
| Comparative catalyst DC-5 prepared in Comparative Example 5 | 64 | 48 | 75 |
| Comparative catalyst DC-6 prepared in Comparative Example 6 | 41 | 30 | 73 |
| Comparative catalyst DC-7 prepared in Comparative Example 7 | 58 | 42 | 72 |
| Comparative catalyst DC-8 prepared in Comparative Example 8 | 61 | 48 | 79 |
| Comparative catalyst DC-9 prepared in Comparative Example 9 | 44 | 34 | 77 |

In Table 3, the activity preservation rate R1 is used to characterize the heavy metal contamination resistance of the catalysts. Definition: activity preservation rate R1=activity after vanadium and nickel contamination and 6 h steam aging/activity after 17 h steam aging×100%.

The results in table 3 show that as compared with the molecular sieve DC-1 to DC-9 prepared by Comparative Examples 1 to 9, the catalysts C-1 to C-7 prepared by Examples 1 to 7 of the present invention all have improved activity preservation rate R1, indicating that the modified molecular sieve catalysts of the present invention has a higher resistance to vanadium and nickel contamination.

As compared with the catalyst DC-1 prepared by Comparative Example 1, the catalyst C-1 prepared by using the molecular sieve Z-1 prepared by Example 1 of the present invention as an active component has the 17 h activity significantly higher by 4% than that of the comparative catalyst DC-1 containing the molecular sieve prepared by Comparative Example 1; when the catalysts are contaminated with vanadium and nickel, the catalyst C-1 prepared by Example 1 has the activity after vanadium and nickel contamination and 6 h steam aging significantly higher by 11% than that of the comparative catalyst DC-1, and the activity preservation rate R1 increased by 11%, indicating that the catalyst of the present invention containing the precipitated yttrium has higher activity stability and resistance to vanadium and nickel contamination. As compared with the catalyst DC-2 prepared by Comparative Example 2, the catalyst C-1 prepared by Example 1 of the present invention has the 17 h activity comparable to that of the comparative catalyst DC-2 prepared by Comparative Example 2; when the catalysts are contaminated with vanadium and nickel, the catalyst C-1 prepared by Example 1 has the activity after vanadium and nickel contamination and 6 h steam aging significantly higher by 5% than that of the comparative catalyst (DC-2), and the activity preservation rate R1 increased by 7%, indicating that the molecular sieve catalyst containing the precipitated yttrium prepared with the organic complexing agent and the dispersing agent according to the present invention has higher activity stability and resistance to vanadium and nickel contamination. As compared with the catalyst DC-3 prepared by Comparative Example 3, the catalyst C-1 prepared by Example 1 of the present invention has the 17 h activity significantly higher by 11% than that of the comparative catalyst DC-3 prepared by Comparative Example 3; when the catalysts are contaminated with vanadium and nickel, the catalyst C-1 prepared by Example 1 of the present invention has the activity after vanadium and nickel contamination and 6 h steam aging significantly higher by 16% than that of the comparative catalyst (DC-3), and the activity preservation rate R1 increased by 11%, indicating that the catalyst containing the precipitated yttrium of the present invention has higher activity stability and resistance to vanadium and nickel contamination.

As compared with the catalyst DC-4 prepared by Comparative Example 4, the catalyst C-2 prepared by Example 2 of the present invention has the 17 h activity significantly higher by 10% than that of the comparative catalyst DC-4 prepared by Comparative Example 4; when the catalysts are contaminated with vanadium and nickel, the catalyst C-2 prepared by Example 2 of the present invention has the activity after vanadium and nickel contamination and 6 h steam aging significantly higher by 16% than that of the comparative catalyst (DC-4), and the activity preservation rate R1 increased by 14%, indicating that the catalyst containing the precipitated rare earth of the present invention has higher activity stability and resistance to vanadium and nickel contamination.

As compared with the catalyst DC-5 prepared by Comparative Example 5, the catalyst C-3 prepared by Example 3 of the present invention has the 17 h activity higher by 2% than that of the comparative catalyst prepared by Comparative Example 5; when the catalysts are contaminated with vanadium and nickel, the catalyst C-3 prepared by Example 3 of the present invention has the activity after vanadium and nickel contamination and 6 h steam aging significantly higher by 9% than that of the comparative catalyst (DC-5), and the activity preservation rate R1 increased by 11%, indicating that the molecular sieve catalyst prepared by using the dispersing agent and urea and the aqueous ammonia precipitating agent according to the present invention has higher activity stability and resistance to vanadium and nickel contamination than the molecular sieve catalyst prepared by the precipitation technique using aqueous ammonia only.

As compared with the catalyst DC-6 prepared by Comparative Example 6, the catalyst C-4 prepared by Example 4 of the present invention has the 17 h activity significantly higher by 20% than that of the comparative catalyst DC-6; when the catalysts are contaminated with vanadium and nickel, the catalyst C-4 prepared by Example 4 of the present invention has the activity after vanadium and nickel contamination and 6 h steam aging significantly higher by 24% than that of the comparative catalyst (DC-6), and the activity preservation rate R1 increased by 15%, indicating that the catalyst prepared by the present invention has higher activity stability and resistance to vanadium and nickel contamination than the catalyst without the precipitated rare earth.

As compared with the catalyst DC-7 prepared by Comparative Example 7, the catalyst C-5 prepared by Example 5 of the present invention has the 17 h activity comparable to that of the comparative catalyst DC-7; when the catalysts are contaminated with vanadium and nickel, the catalyst C-5 prepared by Example 5 of the present invention has the activity after vanadium and nickel contamination and 6 h steam aging higher by 5% than that of the comparative catalyst (DC-7), and the activity preservation rate R1 increased by 9%, indicating that the catalyst prepared by using the dispersing agent of the present invention has higher activity stability and resistance to vanadium and nickel contamination than the catalyst prepared by the precipitation technique using rare earth phosphate without dispersing agent.

As compared with the catalyst DC-8 prepared by Comparative Example 8, when the catalysts are contaminated with vanadium and nickel, the catalyst C-4 prepared by Example 4 of the present invention has the activity after vanadium and nickel contamination and 6 h steam aging significant higher by 6% than that of the comparative catalyst (DC-8), and the activity preservation rate R1 increased by 9%, indicating that the catalyst prepared by the present invention has higher activity stability and resistance to vanadium and nickel contamination than the catalyst without the precipitated rare earth.

As compared with the catalyst DC-9 prepared by Comparative Example 9, when the catalysts are contaminated with vanadium and nickel, the catalysts C-6 and C-7 prepared respectively by Examples 6 and 7 of the present invention have the activity after vanadium and nickel contamination and 6 h steam aging significant higher by 4-5% than that of the comparative catalyst (DC-9), and the activity preservation rate R1 increased by 10% and 7% respectively, indicating that the catalyst prepared by using the complexing agent and the dispersing agent according to the present invention has higher activity stability and resistance to vanadium and nickel contamination than the catalyst prepared by the method of Chinese patent CN02103909.7 in the prior art.

In the preparation method of the modified molecular sieve provided by the Examples of the present invention, the particle size of the precipitates of Group IIIB elements in Examples 1 to 7 cannot be separately tested because the precipitates of Group IIIB elements and the molecular sieves are mixed together and are not isolated separately. In order to characterize the particle size of the precipitates of Group IIIB elements prepared by the method of the present invention, Examples 8-9 and Comparative Example 10 of the present invention provide quantitative data on the preparation and particle size of the precipitates of Group IIIB elements without addition of molecular sieves.

EXAMPLE 8

2 g of citric acid, 2.48 mL of rare earth nitrate and 75 mL of deionized water were mixed together to form a homogeneous solution, and 2 g of ammonium oxalate was added and stirred for 15 minutes to form a rare earth-containing precipitate slurry CD-1.

EXAMPLE 9

2 g of citric acid, 2.48 mL of rare earth nitrate and 75 mL of deionized water were mixed together to form a homogeneous solution, and 2 g of ethanol was added and stirred for 15 minutes to form a rare earth-containing precipitate slurry CD-2.

COMPARATIVE EXAMPLE 10

A rare earth-containing precipitate slurry DCD-1 was prepared in the same manner as in Example 8, except that 2 g of citric acid was not added.

The particle sizes of the rare earth precipitates of the rare earth-containing precipitate slurries CD-1, CD-2 and DCD-1 prepared by Examples 8 and 9 and Comparative Example 10 were tested respectively. The results are shown in Table 4.

TABLE 4

Particle sizes of the rare earth precipitates

| | Particle size, % | | |
|---|---|---|---|
| Item | D(V, 0.1), μm | D(V, 0.5), μm | D(V, 0.9), μm |
| The rare earth-containing precipitate slurry CD-1 prepared by Example 8 | 1.17 | 6.78 | 15.13 |
| The rare earth-containing precipitate slurry CD-2 prepared by Example 9 | 1.16 | 9.08 | 20.53 |
| The rare earth-containing precipitate slurry DCD-1 prepared by Comparative Example 10 | 1.18 | 12.24 | 27.37 |

The results in Table 4 show that as compared with the rare earth-containing precipitate DCD-1 prepared by Comparative Example 10, the rare earth-containing precipitates CD-1 and CD-2 prepared by Examples 8 and 9 are smaller in particle size, indicating that the organic complexing agent and the dispersing agent can effectively reduce the particle size of the precipitates formed by the reaction of the rare earth with the precipitating agent in the present invention.

The invention claimed is:

1. A preparation method of a modified molecular sieve, wherein the preparation method comprises: mixing a molecular sieve slurry, a compound solution containing Group IIIB metal ion of the periodic table, an organic complexing agent, a dispersant and a precipitating agent to obtain a mixed slurry containing the precipitate of Group IIIB element of the periodic table and the molecular sieve, followed by drying and optionally calcining, to obtain the Group IIIB element-modified molecular sieve, wherein the weight ratio of the Group IIIB element in terms of oxide to the molecular sieve on dry basis is 0.3 to 10: 100, the molar ratio of the organic complexing agent to the Group IIIB metal ion is 0.3 to 10: 1, and the molar ratio of the dispersant to the Group IIIB metal ion is 0.2 to 16: 1; wherein the mixing of the molecular sieve slurry, the compound solution containing the Group IIIB metal ion of the periodic table, the organic complexing agent, the dispersant and the precipitating agent is carried out by uniformly mixing the compound solution containing the Group IIIB metal ion of the periodic table, the organic complexing agent, the dispersant with the molecular sieve slurry, adding the precipitating agent and stirring for at least 10 minutes.

2. The preparation method according to claim 1, wherein the preparation method comprises: mixing the molecular sieve slurry, the compound solution containing Group IIIB metal ion of the periodic table, the organic complexing agent, the dispersant and the precipitating agent at a temperature of 5 to 100° C. and stirring for at least 10 minutes to obtain the mixed slurry containing the precipitate of Group IIIB element of the periodic table and the molecular sieve, followed by drying and optionally calcining, to obtain the Group IIIB element-modified molecular sieve, wherein the weight ratio of the Group IIIB element in terms of oxide to the molecular sieve on dry basis is 0.3 to 10: 100, the molar ratio of the organic complexing agent to the Group IIIB metal ion is 0.3 to 10: 1, and the molar ratio of the dispersant to the Group IIIB metal ion is 0.2 to 16: 1.

3. The preparation method according to claim 2, wherein the temperature is 5 to 60° C., and the stirring is carried out for 10 to 40 minutes to obtain the mixed slurry containing the precipitate of Group IIIB element of the periodic table and the molecular sieve.

4. The preparation method according to claim 2, wherein the weight ratio of Group IIIB element in terms of oxide to the molecular sieve on dry basis is 0.3 to 8: 100.

5. The preparation method according to claim 2, wherein the molar ratio of the organic complexing agent to the Group IIIB metal ion is 0.5 to 6: 1; the molar ratio of the dispersant to the Group IIIB metal ion is 1 to 11: 1.

6. The preparation method according to claim 2, wherein the precipitating agent is a substance capable of chemically reacting with the Group IIIB metal ion in the system and making the product thereof slightly soluble or insoluble in the system, in a chemical precipitation reaction.

7. The preparation method according to claim 6, wherein the precipitating agent is one or more of compounds capable of providing or generating hydroxide ions, carbonate ions, bicarbonate ions, phosphate ions, hydrogen phosphate ions, dihydrogen phosphate ions, or oxalate ions.

8. The preparation method according to claim 6, wherein the precipitating agent is one or more of oxalic acid, ammonium oxalate, ammonium carbonate, ammonium bicarbonate, carbon dioxide, aqueous ammonia, phosphoric acid, diammonium hydrogen phosphate, ammonium dihydrogen phosphate, ammonium phosphate and urea.

9. The preparation method according to claim 2, wherein the organic complexing agent is selected from one or more of formic acid, acetic acid, adipic acid, citric acid, tartaric acid, benzoic acid, ethylenediamine tetraacetic acid, salicylic acid and salts thereof, acetylacetone, diethanolamine, and triethanolamine.

10. The preparation method according to claim 2, wherein the dispersant is a surfactant having both lipophilic and hydrophilic properties in the molecule, which can uniformly disperse solid particles that are insoluble in the liquid while preventing the sedimentation and agglomeration of the solid particles, and form a material needed for stabilizing the suspension, and the dispersant does not form precipitates with the Group IIIB metal ion.

11. The preparation method according to claim 10, wherein the dispersant is selected from one or more of monohydric or dihydric alcohol having 2 to 8 carbon atoms, polyethylene glycol, cellulose derivative, polyacrylamide and derivatives thereof, and guar gum.

12. The preparation method according to claim 11, wherein the cellulose derivative is one or more of carboxymethylcellulose sodium, methyl hydroxyethyl cellulose, and hydroxypropyl methyl cellulose; and the monohydric or dihydric alcohol having 2 to 8 carbon atoms is one or more of ethanol, ethylene glycol, isopropanol, butanol, and methylpentanol.

13. The preparation method according to claim 2, wherein the condition for the calcination process is: calcining the molecular sieve in an atmosphere of 100% steam at a calcination temperature of 450-700° C. for a calcination time of 0.5 to 4 hours.

14. The preparation method according to claim 2, wherein the molecular sieve slurry is a sodium-reduced molecular sieve slurry.

15. The preparation method according to claim 9, wherein the organic complexing agent is selected from one or more of citric acid, ammonium citrate, ammonium dihydrogen citrate, diammonium hydrogen citrate, and ethylenediamine tetraacetic acid.

* * * * *